Jan. 24, 1961   V. VACQUIER   2,969,033
AUTOMATIC DEPTH CONTROL SYSTEM
Filed Oct. 15, 1952   4 Sheets-Sheet 4

INVENTOR
VICTOR VACQUIER
BY
R. W. Craddock
ATTORNEY

United States Patent Office 2,969,033
Patented Jan. 24, 1961

2,969,033

AUTOMATIC DEPTH CONTROL SYSTEM

Victor Vacquier, Garden City, N.Y., assignor to Sperry Rand Corporation, a corporation of Delaware Filed Oct. 15, 1952, Ser. No. 314,825

14 Claims. (Cl. 114—25)

My invention relates to control systems for navigable craft. More particularly, the invention is concerned with an elevation control system for a craft that is subject to inner and outer pressures of different magnitudes which are simultaneously but differently affected by vertical movements of the craft about a reference level.

An example of a craft of the nature described is a submarine adapted through a snorkel device or the like to travel underwater under propulsion of diesel or other internal combustion engine operated means. A snorkel device permits such operation since it consists generally of an upwardly extendable tubular structure having an air intake or induction channel opening for the hull at the top or head of the structure and an engine exhaust channel opening located relatively close therebelow. When snorkeling, the submarine is controlled to maintain a snorkel depth, i.e., a depth where, with the snorkel tube extended, the air intake opening is above the surface of the water and the engine exhaust opening is below the surface of the water, the orientation of the latter being made for cooling purposes. In order to prevent sea water from entering the air intake channel, the snorkel is equipped with a head valve which is adapted automatically and with great rapidity to close the intake opening whenever the intake is inundated. As a matter of fact, a mere concentration of spray may in itself be sufficient to trigger the valve and thereby seal the intake opening so long as the spray persists.

With the head valve open, the air consumed by the engine is continuously replaced from the outside through the snorkel intake opening; however, when the intake is closed, the replacement air supply is broken off. This gives rise to an immediate inner hull air pressure drop which quickly worsens until the valve automatically opens on becoming free of the inundation or spray that closed it, or until suitable safety cut-out means brings the engines to a stop. In either event, the members of the crew of the submarine are apt to experience a considerable amount of discomfort brought on by the instability of the pressure of the air surrounding them.

The inner hull pressure, however, may be stabilized to a comfortable degree by controlling the depth of the submarine to maintain the snorkel head above the surface of the sea. But, in overcoming the hazard of unstable air pressure, another more serious hazard may be created. That is to say, the snorkeling depth chosen may be such as to overexpose the snorkel head, and thereby invite detection by enemy radar or the like. Hence, it becomes apparent that the submarine should, for the safety and comfort of its crew, be accurately controlled during snorkeling at an optimum snorkeling depth where the snorkel intake is exposed adequately for pressure stability but to a minimum extent to avoid detection.

Heretofore, submarines have been controlled in depth through the manual efforts of a bow planesman and a stern planesman whose activities have been coordinated by a diving officer. In the coordination process, the officer and the planesman observe a number of factors of importance including the speed of the vessel, its attitude or trim, its depth, and turning rate.

With the advent of the snorkel-equipped submarine, the mental computations demanded of the diving personnel in controlling the tilt of the bow and stern planes have increased greatly due to the highly accurate depth-keeping required while snorkeling. Moreover, the depth-keeping problem is further complicated by the higher underwater speeds facilitated by the snorkel apparatus and by the pronounced effect of surface conditions on the boat at a snorkel depth.

It may be said, therefore, that a point has been reached in submarine development where it is exceedingly difficult and fatiguing for the usual three-man team at a submarine's diving station manually to produce the best depth-keeping results obtainable. The need exists for an automatic depth control system capable of accepting inputs of the factors considered in manual control and substantially instantaneously computing therefrom the plane angles required to maintain the craft at a critical depth such as optimum snorkel depth. The present invention is believed to fulfill this need.

While the system thus far described and to be described hereinafter is set forth in refernce to its assumed installation in a submarine, it is in no manner intended that such reference is meant to limit the present system to the control of a submarine. Hence, the use of the term "submarine" and of terms such as "depth," "diving planes," "snorkel," and the like, peculiar to submarines, is purely for illustrative purposes, it being contemplated that the present invention may be applied to the control of other navigable craft including, for example, aircraft.

Besides being particularly adapted for accurately controlling snorkel depth, however, the present system is also capable of accurately and efficiently controlling depth in general. That is to say, provision is also made whereby the system will perform the following operations:

(1) Maneuver the submerged submarine from an initial depth to an ordered depth with minimum overshooting or hunting and with a minimum of plane activity.

(2) Maintain ordered depth and neutral trim within close limits.

(3) Compensate for trim changes due to turns.

(4) Compensate for the effects of speed.

(5) Compensate for small out-of-trim conditions which result in steady forces tending to create an error in trim and depth.

The principal object of my invention, therefore, is to provide an improved elevation control system for a navigable craft.

Another object is the provision of means responsive to pressures internally and externally of a craft for providing signal data capable of controlling the craft in elevation to maintain the internal pressure thereof at a preselected value.

Another object is to provide a system capable of automatically controlling the depth of a snorkeling submarine about a given depth so as to maintain a given hull air pressure internally of the submarine.

Another object is the provision of a system capable of maneuvering a submarine from an initial depth to an ordered depth with a minimum of overshoot and plane activity, and of maintaining the ordered depth at neutral trim within close limits.

Another object is to provide a system of the character described including means capable of compensating for turn-induced trim or pitch changes, speed-induced control effect changes, and for persistent forces which tend to create errors in trim and depth.

With the foregoing and still other objects in view, the invention includes the novel combinations and arrangements of elements described below and illustrated in the accompanying drawings, in which—

Figure 1:
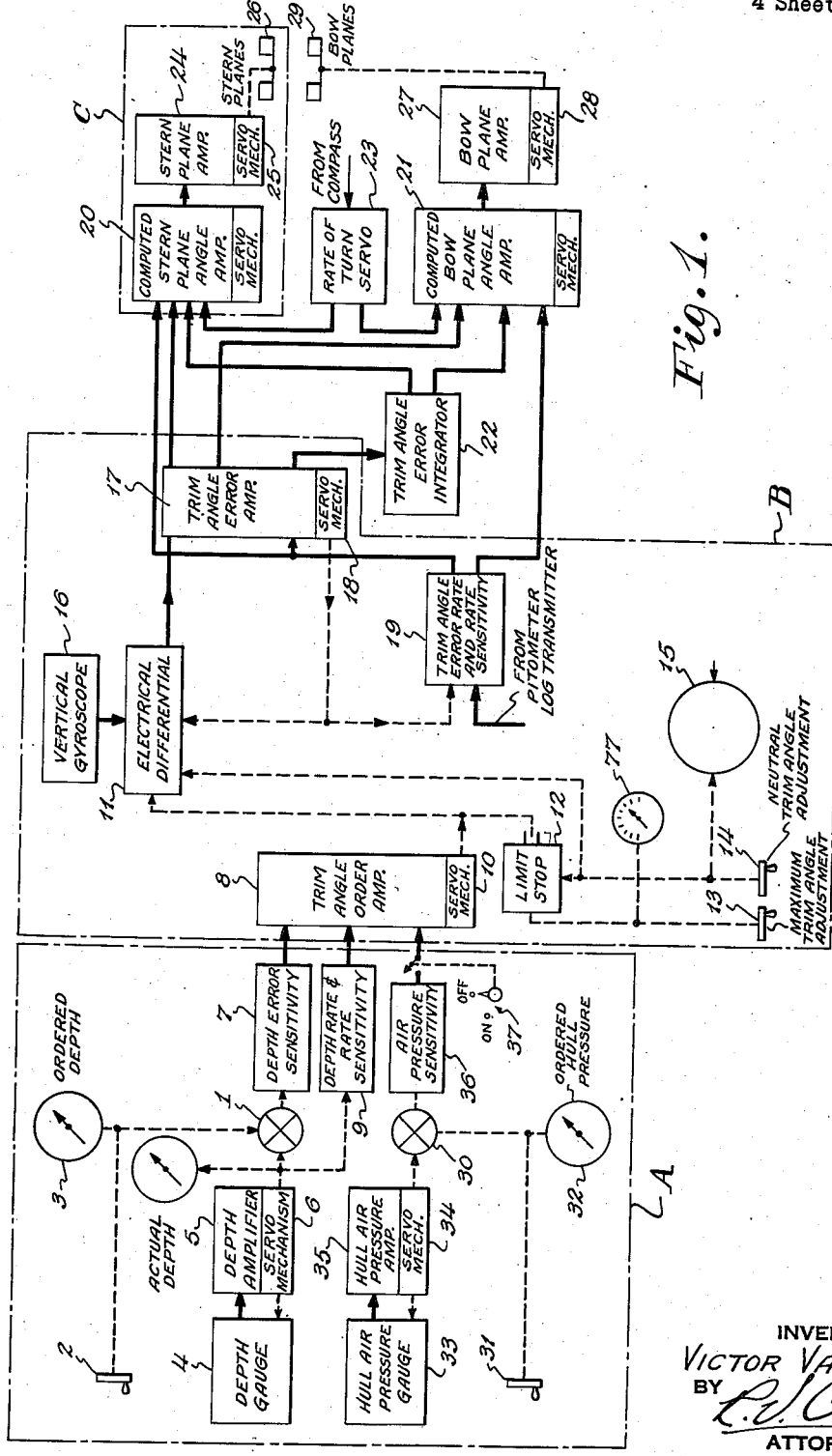
Fig. 1 is a block diagram showing the general flow of electrical and mechanical data throughout the present system as applied to the control of a submarine.
Figure 6:
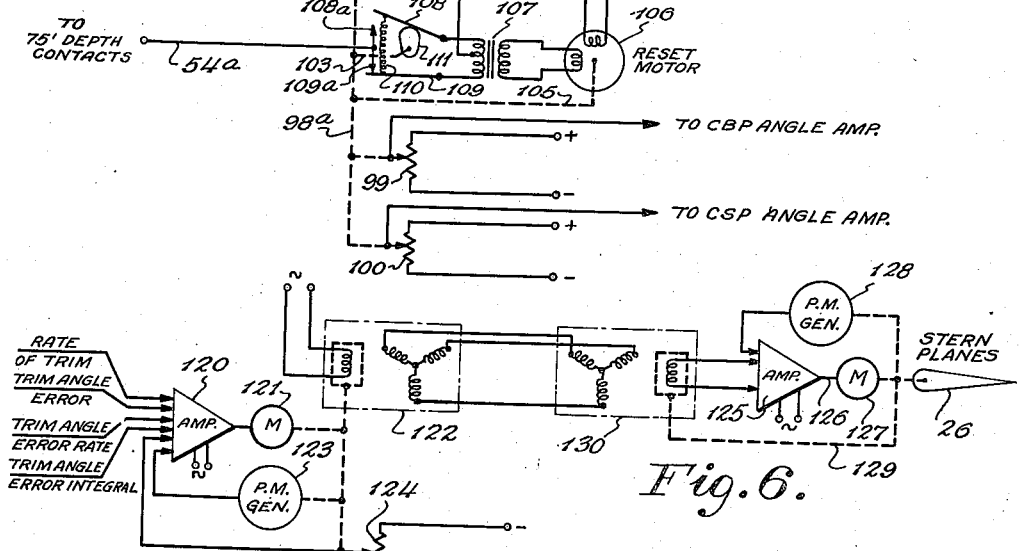
Figure 5:
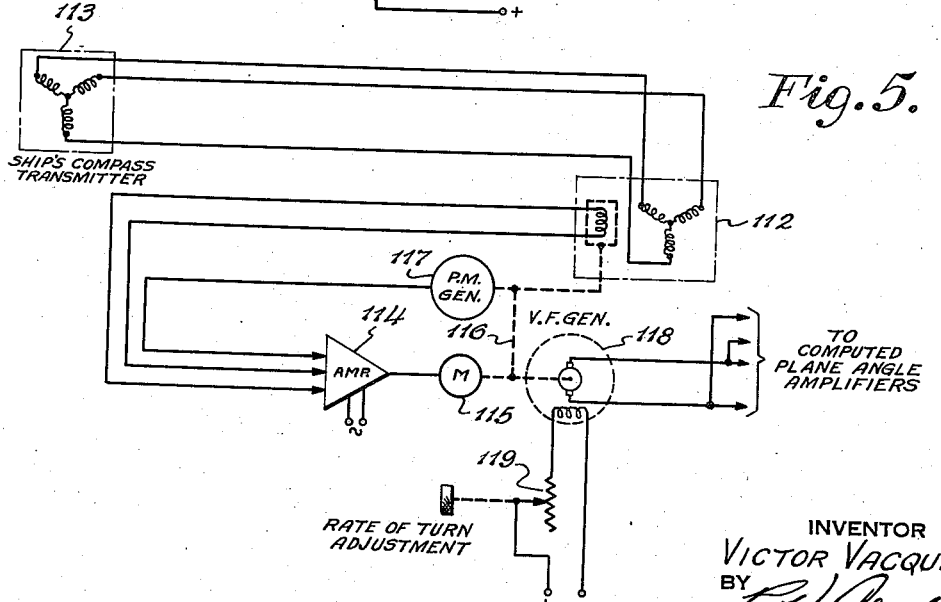

Fig. 5 is a schematic diagram showing details of a preferred arrangement for providing a signal proportional to the time rate of change of craft heading; and Fig. 6 is a schematic diagram showing details of that portion of Fig. 1 designated by the letter C and concerned with computing a stern plane angle or deflection from information supplied thereto by the system, and actuating the stern planes in accordance therewith.

Fig. 1 is presented in order to show the general flow of electrical and mechanical data throughout the present system as embodied in a snorkel-equipped submarine. How this flow of data is put to work in the general control action will first be illustrated by an example; then the components discussed generally in connection therewith will be treated in detail when considering the remaining figures.

Accordingly, assume that the submerged submarine is cruising with a level pitch attitude or with zero trim angle, and is ordered to rise to a depth permitting utilization of its snorkel apparatus. Ordered depth or desired external pressure is introduced as a shaft rotation input to a mechanical differential 1 (Fig. 1) by means of a hand-wheel 2 cooperating with a depth-calibrated indicator device 3. Actual depth or actual external pressure is introduced as another shaft rotation input to differential 1, and is supplied by a hydrostatic pressure sensitive depth gauge 4 which is preferably of the force-balancing or servo follow-up type having a servo element 6 energized by an amplifier 5. The mechanical output of differential 1, in this instance representing a positive depth or pressure error, is fed to a sensitivity adjusting means 7 from which it emerges as an electrical depth error signal which is then furnished to a trim angle order amplifier means 8.

The mechanical output of servo 6, representing actual depth, is also fed to a combined rate-taking and rate-sensitivity adjusting means 9 from which it emerges as an electrical signal representing the time rate of change of depth. The rate signal is then also furnished to trim angle order amplifier means 8 to anticipate any changes occurring in actual depth. Thereupon, amplifier means 8 actuates its associated servo 10 to produce a shaft rotation representing a positive trim angle order which is then supplied to an electrical differential means 11. Provision is made through a limit stop device 12 to limit this trim angle order input to a selected value about an adjustable neutral trim angle. In this regard, a hand-wheel 13 is employed to introduce a shaft rotation into limit stop 12 to effect a setting of the limits therein, while another hand-wheel 14 cooperating with an indicator 15 supplies a shaft rotation for setting the neutral point about which the limits operate.

Differential means 11 receives, also, a mechanical input representing actual trim angle which is furnished from the pitch axis of a conventional vertical gyroscope 16 for comparison with the ordered trim angle. Since the vessel is presently assumed to be horizontal, the actual trim angle output from the vertical gyroscope is zero.

The trim angle error signal, corresponding in magnitude to the ordered trim angle, is supplied from differential means 11 to a trim angle error amplifier means 17, a servo 18 actuated by amplifier means 17 providing a requisite follow-up mechanical input to the differential means. This mechanical input represents trim angle error, due to its follow-up nature; and, besides being fed to differential means 11, it is fed as an input to a combined rate-taking and rate sensitivity adjusting means 19 from which it emerges as two electrical signals, each representing the time rate of change of trim angle error.

An electrical signal obtained from the boat's pitometer log transmitter and representing the speed of the submarine through the water is also fed in input fashion to the combined means 19 wherein it is used automatically to vary the sensitivity of the trim angle error rate signal. By this expedient, compensation is continuously provided for the increase in control effect obtained for a given displacement of the bow and stern planes with an increase in the submarine's speed.

In amplifier means 17, the trim angle error input thereto from differential means 11 is amplified and converted into three trim angle error output signals. One of these signals and one of the trim angle error rate signals from means 19 is fed to a computed stern plane angle amplifier-servo means 20. A second trim angle error signal and the remaining trim angle error rate signal are fed to a computed bow plane angle amplifier-servo means 21. The third trim angle error signal is fed to an integrator means 22 from which it emerges as two electrical signals, each representing the time integral of the trim angle error. One of these integral signals is fed to amplifier-servo means 20, and the other to amplifier-servo means 21, their purpose being to compensate for slight persistent tendencies of the submarine to get out of trim due, for example, to an unbalanced distribution of water ballast.

In order to compensate for a well-known tendency of submarines to "dump" their sterns during a turn maneuver, a rate of turn servo 23 is provided for receiving a heading signal from the submarine's compass transmitter and supplying therefrom two electrical signals, each representing the time rate of change of the boat's heading. One of these heading rate signals is fed to each of the amplifier-servos 20 and 21 to control the amplifier-servos to call for down stern and bow plane angles, respectively, whenever the submarine executes a turn maneuver. In this fashion, the stern is caused to tend to rise an amount sufficient to counter its turn-induced tendency to fall.

From its inputs of trim angle error, trim angle error rate, integrated trim angle error, and heading rate data, each of the amplifier-servos 20 and 21 computes the proper diving plane angle for reaching the ordered snorkel depth. An electrical signal representing the computed stern plane angle is fed from amplifier-servo 20 to a servo amplifier 24 connected to drive a servo 25 for actuating stern planes 26 upwardly. Similarly, an electrical signal representing the computed bow plane angle is fed from amplifier-servo 21 to a servo amplifier 27 connected to drive a servo 28 for actuating bow planes 29 upwardly.

When the submarine assumes the ordered trim angle position, the actual trim angle sensed by vertical gyroscope 16 equals the trim angle order, and the trim angle error is reduced to zero. The respective computed plane angles also reduce to zero and thereby cause the planes to assume a neutral position while the vessel rises toward the ordered snorkel depth.

As ordered depth is approached, the actual depth input from depth gauge 4 approaches the ordered value, thereby reducing the depth error. This causes the output of trim angle order servo 10 to be reduced. Since actual trim angle subtracts in electrical differential 11 from the ordered trim angle value, the difference or trim angle error is introduced to trim angle error amplifier 17 to bring about an ascent-arresting dive angle at the planes. The vessel then maneuvers to the neutral trim angle; and as this is reached, the planes revert to their neutral positions and the submarine cruises at the ordered snorkel depth.

In order to promote personnel comfort and depth control efficiency at snorkel depth, means are provided for automatically controlling the depth of the submarine about the ordered depth so as to maintain the air pressure within the hull at an optimum value, say, for example, ½″ Hg below atmospheric pressure. The optimum or ordered hull air pressure is introduced as a shaft rotation to a mechanical differential 30 by means of a hand-wheel 31 cooperating with a suitably calibrated indicator device 32. Actual hull air pressure is introduced as another shaft rotation input to differential 30, and is supplied by a barometric pressure sensitive gauge 33 which, like depth gauge 4, is preferably of the force-balancing or servo follow-up type and has a servo element 34 energized by an amplifier 35.

The mechanical output of differential 30, representing the hull air pressure error or the difference between actual and ordered hull air pressure, is fed to a sensitivity adjusting means 36 from which it emerges as an electrical hull air pressure error signal. This signal is then connected in controlling relation to bow and stern planes 26, 29 along with the already controlling depth error signal by closing a switch 37 adapted to connect and disconnect the hull air pressure error signal to and from trim angle order amplifier means 8.

By this arrangement, the plane control produced by the depth error signal is effectively modified by the hull air pressure error signal such that the depth level of the submarine is varied about the ordered snorkel depth to maintain the hull air pressure at its ordered value. Hence, if while the submarine is snorkeling under control of the present system, the snorkel head valve is closed by inundation or spray at an excessive frequency or for an excessive duration thereby to cause a drop in hull air pressure, a positive hull air pressure error signal is generated resulting in a slight rise angle at the planes computed to expose just enough more of the snorkel above the sea to prevent excessive closure of the snorkel head valve.

Figure 2:
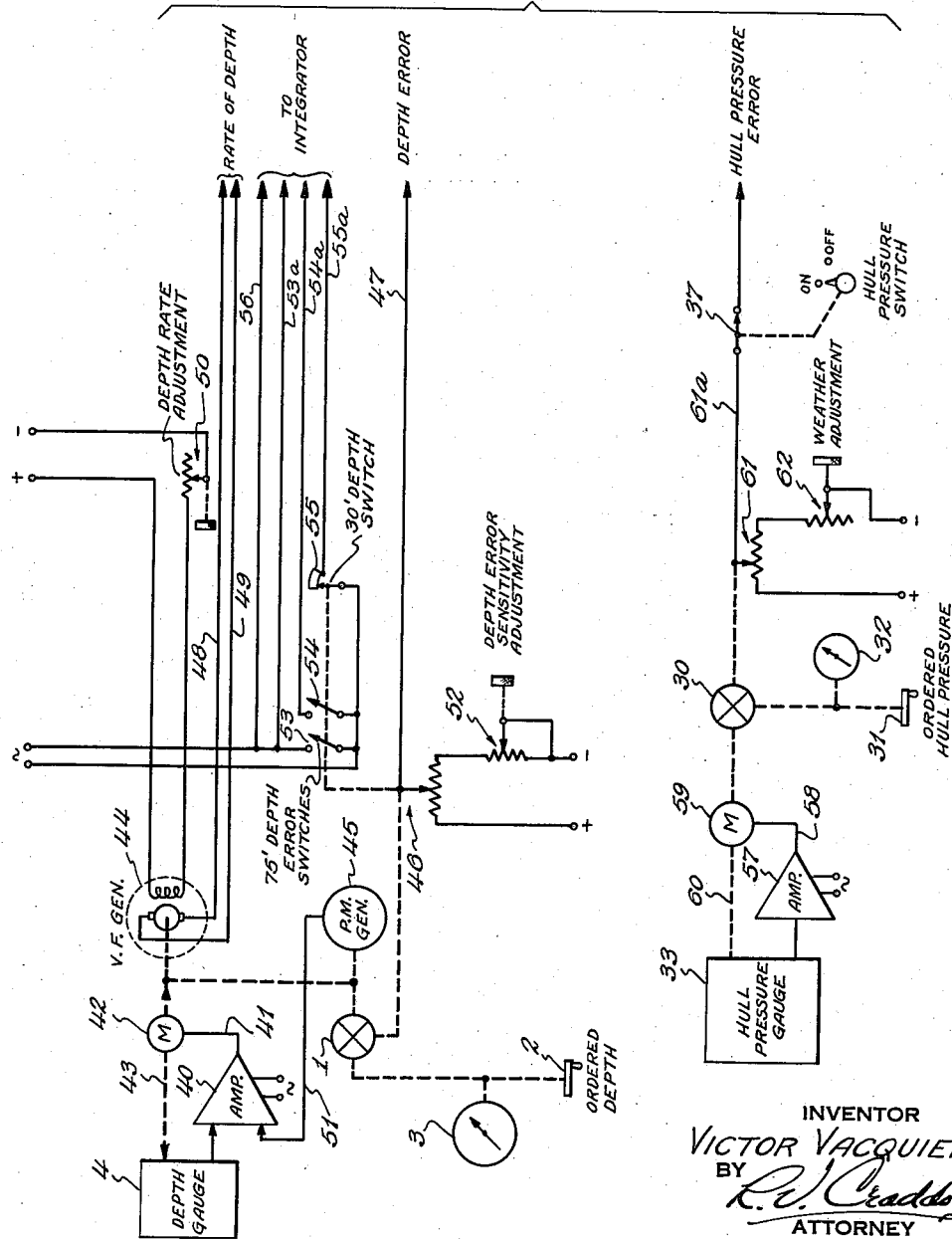
Fig. 2 is a schematic diagram showing details of that portion of Fig. 1 designated by the letter A and concerned with providing depth error, depth error rate, and hull air pressure error signal inputs to the system.
Figure 3:
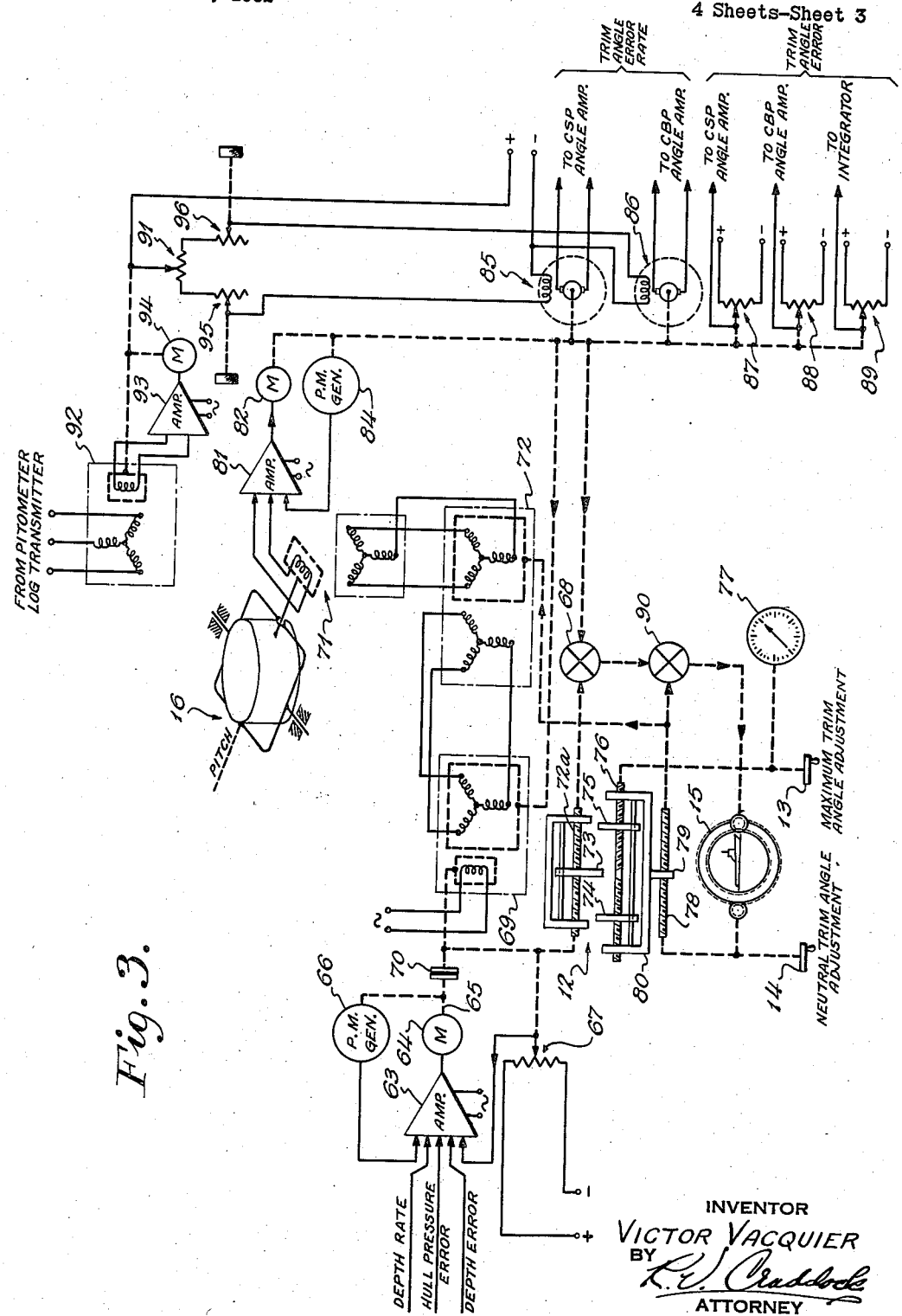
Fig. 3 is a schematic diagram showing details of that portion of Fig. 1 designated by the letter B and concerned with providing trim angle error and trim angle error rate signal inputs to the system.

All that portion of Fig. 1 concerned with supplying the depth error, depth error rate, and hull air pressure error signal inputs to trim angle order amplifier 8 has been designated by the letter A and is shown in greater detail in Fig. 2. The letter B is used to designate that portion of Fig. 1 beginning with trim angle order amplifier 8 and supplying the trim angle error and trim angle error rate signal inputs to the computed plane angle amplifier servos 20, 21. Details of this portion are shown in Fig. 3. Trim angle error integrator 22 and rate of turn servo 23 are shown in greater detail in Figs. 4 and 5, respectively; while Fig. 6 serves to illustrate the details of that portion of Fig. 1 designated by the letter C and containing amplifier-servo 20 and the stern plane operating means 24, 25.

Referring to Fig. 2, depth gauge 4 supplies an electrical signal representing actual depth to an amplifier 40 connected via a lead 41 to energize a servo motor 42 whose shaft 43 provides a follow-up mechanical signal to the depth gauge. Motor shaft 43 is also adapted by suitable mechanical connections to drive a variable-field generator 44, a permanent-magnet generator 45, and one input side of mechanical differential 1, the rotation of shaft 43 being in accordance with actual depth by virtue of its follow-up nature. Ordered depth is introduced to the other input side of differential 1 by means of hand-wheel 2 cooperating with the depth-calibrated indicator 3. The mechanical output of differential 1 represents the depth error or difference between ordered and actual depth, and is employed to drive potentiometer 46 to generate an electrical depth error signal in potentiometer output lead 47. Generator 44, on the other hand, is driven in accordance with actual depth to generate an electrical signal in leads 48, 49 proportional to the time rate of change of actual depth. To permit an adjustment of the sensitivity of the depth rate signal, the field of generator 44 is excited from a suitable source of direct current through a manually adjustable resistor device 50. Permanent-magnet generator provides a feed-back voltage via lead 51 to amplifier 40 to stabilize or smooth the servo action thereby to prevent motor oscillation.

Potentiometer 46 is excited from a suitable source of direct current through an adjustable resistor device 52 which effectively permits a manual adjustment of the sensitivity of the depth error signal in lead 47. Besides driving potentiometer 46, the depth error mechanical output of differential 1 is connected to close a pair of switches 53, 54 when said output corresponds to a depth error exceeding, for example, seventy-five feet, and to open a third switch 55 when said output exceeds, say, thirty feet. Closure of switches 53, 54, 55 serves to place a source of alternating current voltage across their respective leads 53a, 54a, 55a and a common lead 56. The purpose of these switches and their manner of operation will become apparent with the description hereinafter set forth in connection with Fig. 4.

Hull pressure gauge 33 supplies an electrical signal representing actual hull pressure to an amplifier 57 connected via a lead 58 to energize a servo motor 59 whose shaft 60 provides a follow-up mechanical signal to said gauge. Motor shaft 60 is also adapted by a suitable mechanical connection to drive one input side of mechanical differential 30, the rotation of shaft 60 being in accordance with actual depth by virtue of its follow-up nature. Ordered hull pressure is introduced to the other input side of differential 30 by means of hand-wheel 31 cooperating with the pressure-calibrated indicator 32. The mechanical output of differential 30 represents the hull pressure error or difference between ordered and actual hull pressure, and is employed to drive potentiometer 61 thereby to generate an electrical hull pressure error signal in potentiometer output lead 61a. Potentiometer 61 is excited from a suitable source of direct current through an adjustable resistor device 62 which effectively permits a manual adjustment of the sensitivity of the hull pressure error signal in lead 61a. This sensitivity adjustment constitutes a weather adjustment and is provided so that the hull pressure error signal may have more or less control effect on the overall system, depending on the choppiness of the sea. The switch 37 is preferably of the "on-off" type, and in the "on" position serves to connect the hull pressure error signal in lead 61a in controlling relation to the diving planes via the trim angle order system.

By the arrangement thus far described, electrical signals proportional to the depth error, depth error rate, and hull pressure error are supplied as inputs to an amplifier 63 (see Fig. 3).

From these inputs, amplifier 63 furnishes an electrical output representing a trim angle order which is used to drive a motor 64 having a shaft 65. A permanent-magnet generator 66 is driven from shaft 65 to supply a stabilizing feed-back signal to amplifier 63 thereby to prevent oscillation of motor 64. A potentiometer 67, one input side of a mechanical differential 68, and the rotor of a synchro generator 69 are driven from motor shaft 65 through a slip-clutch 70. Potentiometer 67 is excited from a suitable source of direct current, and is provided to generate an electrical follow-up signal for amplifier 63. Signal generator 69 constitutes part of the electrical differential 11 discussed generally in connection with Fig. 1. Besides including generator 69, electrical differential 11 comprises a synchro control transformer 71 and a synchro differential generator 72; and its function is to furnish an electrical signal proportional to trim angle error from (1) a mechanical trim angle order input, (2) a mechanical actual trim angle input supplied by vertical gyroscope 16, and (3) a mechanical neutral trim angle input obtained from rotation of hand-wheel 14.

Slip-clutch 70 works cooperatively with the limit stop mechanism 12, the latter being provided to prevent the mechanical trim angle order signals from exceeding a given magnitude about a neutral trim angle reference. Mechanism 12 preferably consists of a lead screw 72a having a traveling nut or sliding member 73 threaded thereto. Travel of member 73 is in accordance with the trim angle order rotation of shaft 65 until member 73 strikes one or the other of two other traveling nuts or stops 74, 75 mounted on a second lead screw 76 having right-hand threads on one half thereof and left-hand threads on the other half. The separation of stops 74, 75 or the adjustment of maximum trim angle order is governed by the rotation of the hand-wheel 13 cooperating with a suitably calibrated indicator device 77. The neutral point of mechanism 12 may be shifted to the right or left with respect to member 73 by rotating the neutral trim angle adjustment hand-wheel 14 thereby to rotate a third lead screw 78 having a traveling nut 79 bearing a generally C-shaped member 80 rotatably supporting the counter-threaded lead screw 76. By this arrangement, when the trim angle order provided by motor 64 reaches the limit value set by hand-wheel 13, sliding member 73 strikes one of the stops 74, 75; and, while motor 64 may continue to run by virtue of slip-clutch 70, no greater trim angle order than the maximum set is fed to synchro 69 and differential 68.

The stator of synchro 69 is electrically connected to the stator of the synchro control transformer 71 through the synchro differential generator 72. The rotor of transformer 71 is mechanically connected to the pitch axle of the rotor case of vertical gyroscope 16 and is electrically connected in input fashion to an amplifier 81. Differential generator 72 is interposed in the stator connections between synchro 69 and transformer 71 to permit an offset of neutral trim, say ±5° from level trim when desired. Accordingly, the rotor of differential generator 72 is mechanically connected to the neutral trim angle adjustment hand-wheel 14. By this arrangement, an ordered trim angle is compared with actual trim angle and an electrical trim angle error signal modified by a neutral trim angle adjustment is fed to the amplifier 81.

Amplifier 81 amplifies the trim angle error signal and drives a motor 82 in accordance therewith. To make the angular displacement of motor 82 proportional to the trim angle error, the motor shaft 83 is connected to position the stator of synchro 69 in follow-up fashion. A permanent-magnet generator 84 is also driven to provide a stabilizing feed-back signal to amplifier 81. Moreover, motor shaft 83 is connected to drive a first variable-field generator 85, a second variable-field generator 86, and the wipers of first, second, and third potentiometers 87, 88, and 89, respectively, as well as to drive the other input side of differential 68.

The output of differential 68 represents actual trim angle, and is furnished for indication purposes. In this regard, it is fed as an input to a mechanical differential 90, while the other input is obtained from neutral trim angle adjustment hand-wheel 14. The output of differential 90 represents the difference between actual trim and the neutral trim set, and is connected to drive the inner face of a combined indicator 15 whose outer face is positioned by hand-wheel 14 in accordance with the neutral trim set, thereby to provide an indication of actual trim.

Generators 85 and 86 are provided to supply electrical outputs proportional to the time rate of change of the trim angle error. One terminal of a suitable source of direct current is connected to the wiper of a potentiometer 91 having one end connected to the field winding of generator 85 and the other end connected to the field winding of generator 86, while the other D.C. terminal is connected in common to both field windings. Potentiometer 91 is provided for effecting an automatic adjustment of the trim angle error rate signals in accordance with the speed of the submarine, thereby automatically to adjust the overall plane angle sensitivity as a function of submarine speed. In this regard, the stator of a control transformer 92 is electrically connected to the submarine's pitometer log (not shown), and the rotor supplies a speed signal to an amplifier 93. The output of amplifier 93 energizes a motor 94 to drive the wiper of potentiometer 91; and in order to insure that the wiper is displaced from its null position by an amount in proportion to the speed signal received, the rotor of transformer 92 is connected to be driven in follow-up fashion by motor 94.

Besides the provision of an automatic plane angle sensitivity adjustment, provision is also made for manually adjusting the sensitivity or response of the bow and stern planes independently of each other. To this end, a manually adjustable resistor element 95 is placed in series with the field winding of generator 85, thereby to vary the trim angle error rate output of this generator as a function of the adjustment given to element 95. In like fashion, a manually adjustable resistor element 96 is placed in series with the field winding of generator 86. The outputs of generators 85 and 86 are then fed in input relation to computed stern plane angle amplifier 20 and computed bow plane angle amplifier 21, respectively. By this arrangement, compensation is readily made for a well-known greater effectiveness of a submarine's stern planes as compared to the bow planes thereof.

Potentiometers 87, 88, and 89 are each excited from a suitable source of direct current; and, being driven mechanically by motor 82 in accordance with trim angle error, each of the potentiometers generates an electrical signal proportional to the trim angle error. The signal outputs of potentiometers 87 and 88 are fed in input relation to computed stern plane angle amplifier 20 and computed bow plane angle amplifier 21, respectively. However, the signal output of potentiometer 89 is fed to integrator means 22 shown in detail in Fig. 4.

Figure 4:
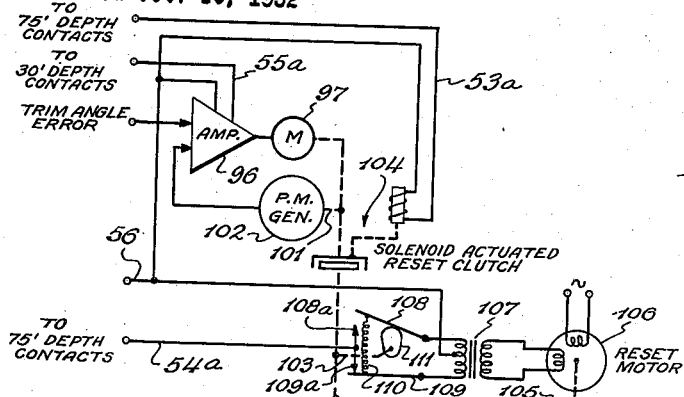
Fig. 4 is a schematic diagram showing details of a preferred integrator arrangement employed for providing a signal proportional to the time integral of trim angle error.

Referring to Fig. 4, the trim angle error output of potentiometer 89 (Fig. 3) is fed to an amplifier 96 connected to energize a motor 97 having a shaft 98. Motor shaft 98 may be connected to drive a first potentiometer 99 and a second potentiometer 100, each of which is excited from a suitable source of direct current. In order that the respective outputs of the potentiometers be in proportion to the time integral of trim angle error, a mechanical connection 101 is made to rotor shaft 98 for driving a permanent-magnet generator 102. The output of generator 102 is then fed in feed-back relation to amplifier 96 to control the speed of motor 97 in accordance with the magnitude of the trim angle error input to the amplifier. Integrator amplifier 96 is energized from a suitable source of alternating current through the contacts of the thirty-foot depth error switch 55 (Fig. 2).

In order to connect shaft 98 to drive potentiometers 99 and 100, a solenoid-actuated clutch 104 is provided which may be energized from a suitable source of alternating current via leads 53a, 56 and the seventy-five foot switch 53 (Fig. 2). Shaft 98 connects to the input side of the clutch, and a shaft 98a connects to the output or potentiometer side thereof. At a point between the clutch and the potentiometers, a mechanical connection 105 is made to shaft 98a from a motor 106 for reset purposes, as will be described.

Motor 106 preferably has a fixed field energized from a suitable source of alternating current and a variable field energized from the secondary of a center-tapped transformer 107. One end of the primary of transformer 107 is connected to a pivoted contact arm 108 cooperating with a contact 108a, and the other end is connected to a pivoted contact arm 109 cooperating with a contact 109a. A spring member 110 is connected to arms 108, 109 to urge each toward the other. Contact 108a and arm 108 form one switch, while contact 109a and arm 109 form another switch. Contacts 108a, 109a are connected in common to one terminal of a source of alternating current via the lead 54a, while the center-tap of transformer 107 is connected via the lead 56 to the other terminal of said current source. Rotatably disposed between arms 108, 109 is a cam member 111 driven by a mechanical connection to shaft 98a and arranged to open one or the other of the switches, depending on the rotation of shaft 98a.

By means of the thirty-foot depth error switch 55, the integrator is automatically stopped for errors in depth exceeding thirty feet. Should the error continue to increase, the integrator remains stopped; and, if the error reaches seventy-five feet, clutch 104 is opened and motor 106 is energized through one of the cam-operated switches 108, 108a or 109, 109a to drive shaft 98a in a direction to reset the potentiometers 99, 100. A reset depth error of seventy-five feet is chosen, since it signifies that the submarine is about to operate under different trim conditions, such as those due to changes in water density and in thermal currents. However, the resetting of the integrator potentiometers at a seventy-five foot depth error and the stopping of the integrator at a thirty-foot depth error is not to be construed as limiting these operations to the noted depth errors, the particular depth errors being set forth as such solely for illustrative purposes. By this arrangement, an electrical signal representing the time integral of the trim angle error may be produced at each of the potentiometers 99, 100, thereby to provide an input to the respective computed plane angle amplifiers 20, 21 which is capable of compensating the present system for sustained or persistent trim angle errors due, for example, to an unbalanced distribution of water ballast.

The rate of turn servo 23 shown in detail in Fig. 5 is provided for supplying electrical signals in accordance with the turning rate of the submarine so that these signals might be used in computed plane angle amplifiers 20, 21 to compensate for the tendency of a submarine to "dump" its stern an amount in proportion to turning rate. As shown in Fig. 5, the stator of a synchro control transformer 112 is electrically connected to receive heading data from the submarine's compass, designated generally by the numeral 113. An amplifier 114 is connected to the rotor of transformer 112 to receive this data and energize a motor 115 in accordance therewith. A mechanical connection 116 provides a follow-up connection from the motor shaft to the rotor of the transformer. A stabilizing feed-back signal for amplifier 114 is furnished by a permanent-magnet generator 117 driven by the motor. Also driven by motor 115 is a variable-field generator 118 for providing an electrical signal output proportional to the rate of change of heading or rate of turn. In order to provide means for varying the control effect of this rate of turn signal to suit different operating conditions, a manually adjustable resistor device 119 is placed in series with the direct current supply to the field of generator 118.

Fig. 6 serves to illustrate how the signal inputs to the computed plane angle amplifiers are employed to bring about the actuation of the diving planes. Substantially identical computed plane angle amplifiers and actuating mechanisms are used for the stern and bow planes. Hence, Fig. 6 shows the stern plane system, only, for illustrative purposes. In this regard, an amplifier 120 receives the signal inputs representing rate of turn, trim angle error, trim angle error rate, and integrated trim angle error and is capable of providing a signal output therefrom calling for an angular displacement of the stern planes from their neutral position. The electrical stern plane angle signal is connected to energize a motor 121 adapted by suitable mechanical means to position the rotor of a synchro generator 122. Motor 121 is also adapted to drive a permanent-magnet generator 123 for supplying a stabilizing feed-back signal to amplifier 120, and to drive the wiper of a direct-current excited potentiometer 124 connected to supply a position feed-back or follow-up signal to amplifier 120. The stator of synchro 122 is electrically connected to the stator of a synchro control transformer 130 whose rotor is connected in input fashion to an amplifier 125. By this arrangement, the plane angle signal is amplified so that it may be employed via lead 126 to energize a motor 127 connected to drive the stern planes 26. A stabilizing feed-back signal is supplied to amplifier 125 by a permanent-magnet generator 128 driven by the motor, and a mechanical connection 129 is also made from the motor to the rotor of transformer 130 for follow-up purposes.

Since many changes could be made in the above construction and many apparently widely different embodiments of this invention could be made without departing from the scope thereof, it is intended that all matter contained in the above description or shown in the accompaning drawings shall be interpreted as illustrative and not in a limiting sense.

What is claimed is:

1. A control system for a navigable craft subject to inner and outer pressures of different magnitudes, both pressures being simultaneously but differently affected by vertical movements of said craft about a reference level, said system comprising means for providing a first signal proportional to the difference between the actual inner pressure and a given inner pressure, means for providing a second signal proportional to the difference between the actual outer pressure and the outer pressure which would be obtained at said reference level, means for controlling the vertical movement of said craft, and means for connecting said first and second signals in controlling relation to said last-recited means whereby the craft may be controlled vertically to move about said reference level so as to maintain an inner pressure substantially equal to said given inner pressure.

2. The control system of claim 1 further comprising means for providing a third signal proportional to the rate of change of the outer pressure, and wherein the connecting means serves also to connect said third signal in controlling relation to the vertical movement controlling means.

3. The control system of claim 2 wherein the connecting means includes means for varying the sensitivity of at least one of the first, second and third signal-providing means.

4. A control system for a navigable craft subject to inner and outer pressures of different magnitudes, both pressures being simultaneously but differently affected by vertical movements of said craft about a reference level, said system comprising means for providing a first signal proportional to the difference between the actual inner pressure and a given inner pressure, means for providing a second signal proportional to the difference between the actual outer pressure and the outer pressure which would be obtained at said reference level, first and second means respectively located at opposite ends of the craft for controlling the vertical movement of said craft, and means for connecting said first and second signals in controlling relation to at least one of said first and second movement controlling means whereby the craft may be controlled to maintain said reference level.

5. The control system of claim 4 further comprising means for providing a third signal proportional to the time rate of change of heading of the craft, and wherein the signal connecting means serves also to connect said third signal in controlling relation to at least one of the first and second movement controlling means.

6. A control system for a navigable craft subject to inner and outer pressures of different magnitudes, both pressures being simultaneously but differently affected by vertical movements of said craft about a reference level, said system comprising means for providing a first signal proportional to the difference between the actual inner pressure and a given inner pressure, means for providing a second signal proportional to the difference between the actual outer pressure and the outer pressure which would be obtained at said reference level, amplifier means for providing a third signal dependent on said first and second signals, means including a vertical gyroscope for providing a fourth signal proportional to the difference between the pitch attitude of the craft and a neutral pitch attitude, differential means for providing a fifth signal proportional to the difference between said third and fourth signals, means for controlling the pitch attitude of the craft, thereby to control the vertical movement of said craft, and means connecting said fifth signal in controlling relation to said last-recited means whereby the craft may be controlled about said reference level to maintain said neutral pitch attitude and said given inner pressure.

7. The control system of claim 6 further comprising means for providing a sixth signal proportional to the time integral of the fifth signal, and wherein the signal connecting means serves also to connect said sixth signal in controlling relation to the pitch attitude controlling means.

8. The control system of claim 6 further comprising means for limiting the third signal to a predetermined magnitude.

9. The control system of claim 6 further comprising means for effectively varying the neutral pitch attitude.

10. In a control system for a navigable craft having a hull subject to internal and external pressures which differ in response to vertical movements of said craft from a reference level, means for providing a first signal proportional to the difference between said internal pressure and a first reference pressure, means for providing a second signal proportional to the difference between said external pressure and a second reference pressure, amplifier means connected to receive said first and second signals and adapted to provide a third signal dependent thereon, means including a vertical gyroscope for providing a fourth signal proportional to the difference between the pitch attitude of the craft and a reference pitch attitude, differential means connected to receive said third and fourth signals and adapted to provide a fifth signal in accordance with the difference therebetween, means for providing sixth signal proportional to the time rate of change of said fifth signal, means for providing a seventh signal proportional to the speed of the craft, means connected to be controlled by said seventh signal for varying the magnitude of said sixth signal, means for controlling the vertical movement of said craft, and means for connecting said fifth and sixth signals in controlling relation to the last-recited means whereby, while controlling the craft about said reference level to maintain said pitch attitude and said internal pressure substantially in agreement with the reference values thereof, the system is varied in sensitivity as a function of craft speed.

11. In a system for controlling the depth of a snorkel-equipped undersea vessel having a set of bow planes and a set of stern planes, the combination comprising depth responsive means for providing a first signal representing the difference between the depth of the vessel and an ordered snorkel-operating depth, hull pressure responsive means for providing a second signal representing the difference between the air pressure within the hull of the vessel and an ordered air pressure, and means for connecting said first and second signals in controlling relation to said bow and stern planes whereby the depth of the vessel may be controlled about said ordered depth substantially to maintain the hull air pressure at the ordered value thereof while snorkeling.

12. The system of claim 11 further including means for varying the controlling effect of the first and second signals in accordance with the speed of the vessel.

13. The system of claim 11 further including means for providing a third signal dependent on the time rate of change of heading of the vessel, said signal being of one sense notwithstanding heading changes in different directions, the connecting means serving also to connect said third signal in controlling relation to the bow and stern planes, thereby to compensate for any tendency of the vessel to change its trim during a turn maneuver.

14. A depth control system for a snorkel-equipped submarine subject to variations in hull air pressure brought about by changes in depth while snorkeling, said system comprising means for providing a first signal proportional to the difference between said hull air pressure and a reference air pressure, said reference air pressure being the average pressure which would be obtained when the submarine is traveling at an optimum snorkeling depth, means for providing a second signal proportional to the difference between the depth of the submarine and snorkel operating depth, diving plane means for controlling the depth of the submarine, and means for connecting said first and second signals in controlling relation to said last-recited means whereby the depth of the submarine may be controlled about said snorkel operating depth to maintain said reference air pressure.

References Cited in the file of this patent
UNITED STATES PATENTS

| | | |
|---|---|---|
| 2,415,429 | Kellogg et al. | Feb. 11, 1947 |
| 2,415,430 | Frische et al. | Feb. 11, 1947 |